(12) United States Patent
Armstrong et al.

(10) Patent No.: US 7,752,367 B2
(45) Date of Patent: Jul. 6, 2010

(54) FILE-BASED ACCESS CONTROL FOR SHARED HARDWARE DEVICES

(75) Inventors: Joseph Donald Armstrong, Rochester, MN (US); Ajay Kumar Mahajan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 11/316,266

(22) Filed: Dec. 22, 2005

(65) Prior Publication Data

US 2007/0150630 A1    Jun. 28, 2007

(51) Int. Cl.
G06F 12/00    (2006.01)
(52) U.S. Cl. ...................................... 710/200; 710/260
(58) Field of Classification Search .................. 710/200, 710/240–244, 260–269; 711/151
See application file for complete search history.

(56) References Cited

U.S. PATENT DOCUMENTS

| | | | |
|---|---|---|---|
| 5,251,317 A | 10/1993 | Iizuka et al. | |
| 5,303,368 A * | 4/1994 | Kotaki | 707/8 |
| 5,625,795 A | 4/1997 | Sakakura et al. | |
| 5,630,134 A | 5/1997 | Haga | |
| 5,729,749 A | 3/1998 | Ito | |
| 5,892,954 A * | 4/1999 | Tomas et al. | 710/200 |
| 6,105,098 A | 8/2000 | Ninose et al. | |
| 6,105,099 A | 8/2000 | Freitas et al. | |
| 6,343,338 B1 * | 1/2002 | Reneris | 710/200 |
| 6,401,110 B1 | 6/2002 | Freitas et al. | |
| 6,848,102 B2 | 1/2005 | Nakahara et al. | |
| 7,107,267 B2 * | 9/2006 | Taylor | 707/8 |
| 2002/0004810 A1 | 1/2002 | Reneris | |
| 2003/0105796 A1 | 6/2003 | Sandri et al. | |
| 2004/0073758 A1 * | 4/2004 | Blumrich et al. | 711/151 |
| 2004/0143712 A1 | 7/2004 | Armstrong et al. | |
| 2004/0230972 A1 | 11/2004 | Donovan et al. | |
| 2005/0165938 A1 * | 7/2005 | Cornett | 709/229 |

* cited by examiner

*Primary Examiner*—Mark Rinehart
*Assistant Examiner*—Kim T Huynh
(74) *Attorney, Agent, or Firm*—Wood, Herron & Evans, LLP (57) ABSTRACT

An apparatus, program product and method effectively virtualize a hardware device shared between multiple processors by a file accessible by a processor such that access to the hardware device may be controlled via a lock associated with the file. By doing so, file-based locking, e.g., as provided by a file locking facility in an operating system running on a processor, may be used to control access to the hardware device on behalf of the processor.

22 Claims, 5 Drawing Sheets

FILE-BASED ACCESS CONTROL FOR SHARED HARDWARE DEVICES

FIELD OF THE INVENTION

The invention relates to computers and computer software, and in particular, to controlling access to shared hardware devices in a computer.

BACKGROUND OF THE INVENTION

Given the continually increased reliance on computers in contemporary society, computer technology has had to advance on many fronts to keep up with increased demand. One particular subject of significant research and development efforts is parallelism, i.e., the performance of multiple tasks in parallel.

A number of computer software and hardware technologies have been developed to facilitate increased parallel processing. From a hardware standpoint, computers increasingly rely on multiple microprocessors to provide increased workload capacity. Furthermore, some microprocessors have been developed that support the ability to execute multiple threads in parallel, effectively providing many of the same performance gains attainable through the use of multiple microprocessors. In some instances, the provision of parallel components also assists in improving system reliability from the standpoint that parallel components may provide redundancy to enable one such component to take over for another component that has failed. From a software standpoint, multithreaded operating systems and kernels have been developed, which permit computer programs to concurrently execute in multiple threads so that multiple tasks can essentially be performed at the same time.

In addition, some computers implement the concept of logical partitioning, where a single physical computer is permitted to operate essentially like multiple and independent "virtual" computers (referred to as logical partitions), with the various resources in the physical computer (e.g., processors, memory, input/output devices) allocated among the various logical partitions. Each logical partition executes a separate operating system, and from the perspective of users and of the software applications executing on the logical partition, operates as a fully independent computer.

While parallelism effectively increases system performance by virtue of the ability to perform multiple tasks at once, one side effect of parallelism is increased system complexity due to the need to synchronize the operation of multiple concurrent processes or threads, particularly with regard to data structures and other system resources that are capable of being accessed by multiple processes or threads. Separate processes or threads that are capable of accessing specific shared data structures are typically not aware of the activities of other threads or processes. As such, a risk exists that one thread might access a specific data structure in an unexpected manner relative to another thread, creating indeterminate results and potential system errors.

One particular application where synchronization may be required is in the area of enabling multiple processors in a computer to access and control a hardware device that is only capable of being accessed by one processor at a time. Particularly when the processors and/or the operating systems running thereon are multithreaded, such that multiple applications running on the processors are capable of accessing a hardware device at the same time, switching control over a hardware device from one processor to another, and in particular, determining when all of the applications on a processor are no longer accessing a hardware device, can be problematic.

In some conventional designs, counters have been used to moderate the control of hardware devices between a plurality of processors, when the possibility exists that multiple applications on a particular processor may be able to use a hardware device at the same time. With a counter, each time a device is to be used, the count is incremented, and when the device is released, the count is decremented. A common problem associated with using a counter, however, is the possibility of encountering non-zero run time errors, e.g., when an application fails or locks up and prevents the counter from being decremented. When this occurs, a processor permanently locks the hardware until recovery measures are taken.

In other conventional designs, device drivers have been used to synchronize access to their associated hardware devices, or alternatively, separate management software has been used to manage multiple hardware devices. In some instances, however, certain hardware devices and/or the hardware that is used to interface with such hardware device may not be represented by a device driver on a processor. Furthermore, the hardware may not support a locking capability. In addition, when using counters, as well as when using device drivers or management software, both shared and exclusive access are typically not supported.

One particular design for which the aforementioned access control techniques are insufficient is in a multi-user computer design that utilizes redundant service processors to aid in the initialization and management of the computer, e.g., to perform a boot up process and to perform a number of monitoring, recovery, reporting and other tasks in connection with Reliability, Availability and Serviceability (RAS). When multiple service processors are used, a shared communication path, e.g., a multiplexer, may be provided between the service processors and the system processors, memory and various other peripheral devices comprising the Central Electronics Complex (CEC) of the computer. In such a scenario, only one service processor is able to communicate through the multiplexer at a time, so some mechanism is required to control which service processor is permitted to use the multiplexer at any point in time.

Control of the usage of the multiplexer by a service processor is complicated by the fact that multiple shared hardware devices may be accessible to a service processor via the multiplexer, and furthermore, multiple applications running on the service processor may be accessing different shared hardware devices at the same time. Typically, shared hardware devices are represented in a service processor using device drivers; however, in many designs, the multiplexer itself is not known to the operating system of the service processor as a device and therefore is not represented by a device driver. Consequently, a problem exists as to how to control use of the multiplexer and to prevent the multiplexer from being given up when in use.

Counters, as discussed above, are not optimal due to the inability to support exclusive and shared access, as well as due to the possibility of one application hanging and failing to decrement a counter. Device drivers and/or management software are also not optimal, again in part due to the inability to support exclusive and shared access. Furthermore, for device drivers, each require custom programming, and when multiple hardware devices are connected to a service processor via a multiplexer, no device driver is available to manage access to the multiplexer itself From the standpoint of management software, service processors typically run an embedded operating system and have extremely limited onboard memory, so the inclusion of management software would restrict the available nonvolatile and runtime memory available for other applications needed by the service processor.

Therefore, a significant need continues to exist for an improved manner of managing access to a shared hardware device by multiple processors.

SUMMARY OF THE INVENTION

The invention addresses these and other problems associated with the prior art by providing an apparatus, program product and method in which a hardware device is effectively virtualized by a file accessible by a processor such that access to the hardware device may be controlled via a lock associated with the file. By doing so, file-based locking, e.g., as provided by a file locking facility in an operating system running on the processor, may be used to control access to the hardware device.

Therefore, consistent with the invention, a hardware device shared by a plurality of processors may be accessed by associating the shared hardware device with a file accessible by a first processor among the plurality of processors, and controlling access to the shared hardware device by at least one application executing on the first processor using a lock associated with the file.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments discussed hereinafter utilize file-base access control to control access to hardware devices shared by multiple processors in a computer or other programmable electronic device. In particular, embodiments consistent with the invention effectively virtualize a hardware device and/or the communication path through which the hardware device is coupled to the processors with a file, such that access to the hardware device may be controlled via a lock associated with the file.

As will become more apparent below, by using file locking as a mechanism, multiple applications running on a processor can specify shared or exclusive lock requests, and the mechanism is separated from any hardware specific device driver. Furthermore, the overhead associated with implementing file-based locking, both in terms of development, processing, and storage overhead, is typically relatively modest.

Consistent with the invention, each instance of a shared hardware device may be virtualized with a file, or alternatively a file may be used to virtualize a communication path through which the shared hardware device is coupled to the processor, such that the same file may be used to virtualize and control all of the shared hardware devices accessible through the same communication path.

In this regard, a communication path may be considered to include any hardware component interposed between multiple processors and one or more hardware devices accessible thereto, where the communication path is only capable of being used by a subset of the processors at a given time (e.g., only one processor at a time), and thus does not provide unlimited access to every processor at all times. In the illustrated embodiment, a communication path takes the form of a multiplexer; however, other components may be disposed in a communication path in other embodiments consistent with the invention. It should also be appreciated that even where multiple hardware devices are connected via the same communication path, multiple communication paths may be provided in a single design, e.g., to support multiple subsystems of shared hardware devices.

Typically, in embodiments consistent with the invention, identical files are maintained on each processor having access to a hardware device such that each processor can independently manage access to the hardware device. File locking is then used on each processor to control access to the hardware device. All applications that use the shared hardware are required to first get a lock on the file associated with the hardware device and/or the multiplexer or other communication path through which the processor is coupled to the shared hardware.

In the illustrated embodiment, for example, all hardware devices coupled to a processor through a multiplexer are virtualized by the same file, referred to as a MUX file, such that any application that wishes to access a hardware device must first get a lock on the MUX file associated with that hardware.

Furthermore, in the illustrated embodiment, both shared and exclusive locks are supported. Shared locks are used on the processor that has control of the multiplexer, while an exclusive lock is obtained on any processor that is not currently controlling the multiplexer. Typically, the exclusive lock is held by a management application running on the processor, such that other applications are only permitted to access the hardware with a shared lock. By doing so, a management application is able to hold an exclusive lock whenever a processor does not have control of the multiplexer, and thus prevent any other applications on the same processor from accessing the hardware, as the presence of the exclusive lock on the MUX file precludes any application from obtaining a shared lock on the same file. In addition, when a processor needs to release control of the MUX to another processor, the management application can request an exclusive lock that will be granted once all applications that currently have a shared lock release those locks, and effectively lock out any applications that later attempt to obtain a shared lock after the exclusive lock has been requested.

The usage of file-based locking provides a number of advantages over conventional techniques. As opposed to counters, file locking in the manner described herein enables an exclusive lock to be used to prevent applications from obtaining access to a hardware device when control has been or is about to be switched to another processor. Furthermore, typically all applications running on a processor can use file operations, whereas counters often require shared memory (which is often at a premium in an embedded design) to be used to maintain the count. Also, time-out values while waiting for a lock can often be implemented using the underlying file locking facility supported by an operating system, thus reducing the likelihood of an application hanging the system due to an inability to decrement a counter. Moreover, as opposed to management software, file locking is typically supported by the operating system running on the processor, so the overhead is typically much lower.

Figure 1:
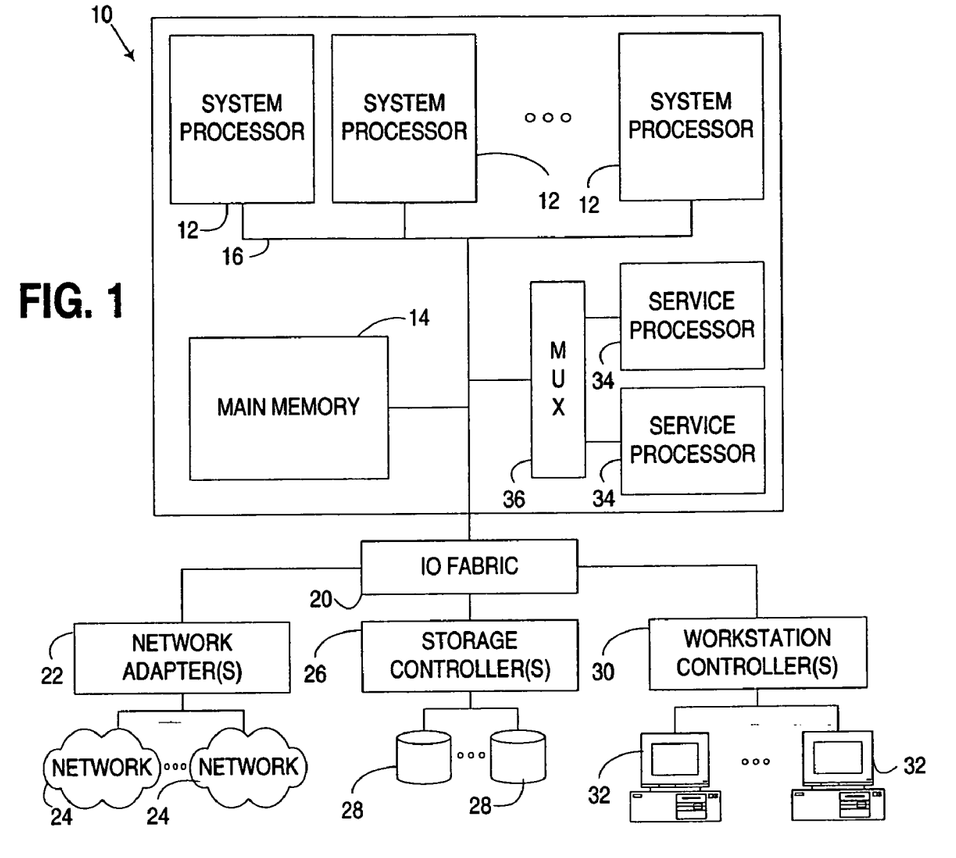
FIG. 1 is a block diagram of the principal hardware components in a computer suitable for utilizing file-based access control for shared hardware devices consistent with the invention.

Turning now to the Drawings, wherein like numbers denote like parts throughout the several views, FIG. 1 illustrates the principal hardware components in an apparatus 10 capable of implementing file-based access control consistent with the invention. Apparatus 10 is illustrated as a multi-user computer, and may generically represent, for example, any of a number of multi-user computers such as a network server, a midrange computer, a mainframe computer, etc., e.g., an IBM eServer iSeries or pSeries computer. However, it should be appreciated that the invention may be implemented in other computers and data processing systems, e.g., in single-user computers such as workstations, desktop computers, portable computers, and the like, or in other programmable electronic devices (e.g., incorporating embedded controllers and the like). Apparatus 10 will hereinafter also be referred to as a "computer," although it should be appreciated the term "apparatus" may also include other suitable programmable electronic devices consistent with the invention. In addition, an apparatus may be considered to include one or more components or subsystems of a computer or other electronic device, e.g., an integrated circuit chip.

Computer 10 generally includes one or more system processors 12 coupled to a memory 14 and an IO fabric 20 via a bus 16. Memory 14 may include one or more levels of memory devices, e.g., a DRAM-based main storage, as well as one or more levels of data, instruction and/or combination caches, with certain caches either serving individual processors or multiple processors as is well known in the art. Furthermore, IO fabric 20 provides access to various external or peripheral devices, e.g., one or more network adapters 22 (for interfacing the computer with network(s) 24), one or more storage controllers 26 (for interfacing the computer with one or more storage devices 28) and one or more workstation controllers 30 (for interfacing with one or more terminals or workstations 32 via a plurality of workstation adapters).

In addition, computer 10 includes a plurality of service processors 34, each of which is used to run specialized firmware code to manage system boot up (also referred to as system initialization or initial program load (IPL)), and to otherwise monitor, diagnose and configure system hardware. In the illustrated embodiment, for example, two service processors 34, which are each capable of operating as either a backup or primary service processor, are used in computer 10, and to this extent, the service processors provide an additional degree of redundancy and failure avoidance. Typically, whichever service processor 34 that is designated as a backup will only be used whenever the primary service processor fails, or whenever monitoring, testing or diagnosis of the primary service processor is required.

Service processors 34 are illustrated as coupled to system bus 16 via a multiplexer 36, which serves as a communication path to the components forming the Central Electronics Complex (CEC) for computer 10 (namely, system processors 12, memory 14, and various support chips and circuitry not shown in FIG. 1, e.g., VPD chips, UART chips, JTAG circuits, GPIO circuits, I2C circuits, etc.). In this regard, each component in computer 10 that can be accessed by a service processor 34 may be considered to be a shared hardware device consistent with the invention.

It will also be appreciated that the precise manner in which service processors 34 and multiplexer 36 are coupled to the various hardware devices in computer 10 may vary, i.e., hardware devices need not be accessed via system bus 16. Indeed system bus 16 in FIG. 1 is illustrated in simplified form to represent generally that components 12, 14, 20 and 36 are in communication with one another, and no specific communication network topology should be implied from FIG. 1. Furthermore, it may be desirable to utilize separate multiplexers to handle different types of communications, e.g., to provide separate multiplexers to handle JTAG, GPIO and I2C and other types of communications.

Computer 10 operates under the control of an operating system, and executes or otherwise relies upon various computer software applications, components, programs, objects, modules, data structures, etc. Additional applications, components, programs, objects, modules, etc. may also execute on one or more processors in another computer coupled to computer 10 via a network, e.g., in a distributed or client-server computing environment, whereby the processing required to implement the functions of a computer program may be allocated to multiple computers over a network. In addition, computer 10 may be implemented as a logically-partitioned computer, whereby multiple partitions, each with a separate operating system, are resident in the computer.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to tangible recordable type media such as volatile and non-volatile memory devices, floppy and other removable disks, hard disk drives, magnetic tape, flash drives, optical disks (e.g., CD-ROM's, DVD's, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention. For example, file-based access control may be utilized in a wide variety of other environments where multiple processors are capable of accessing one or more shared hardware devices.

Figure 2:
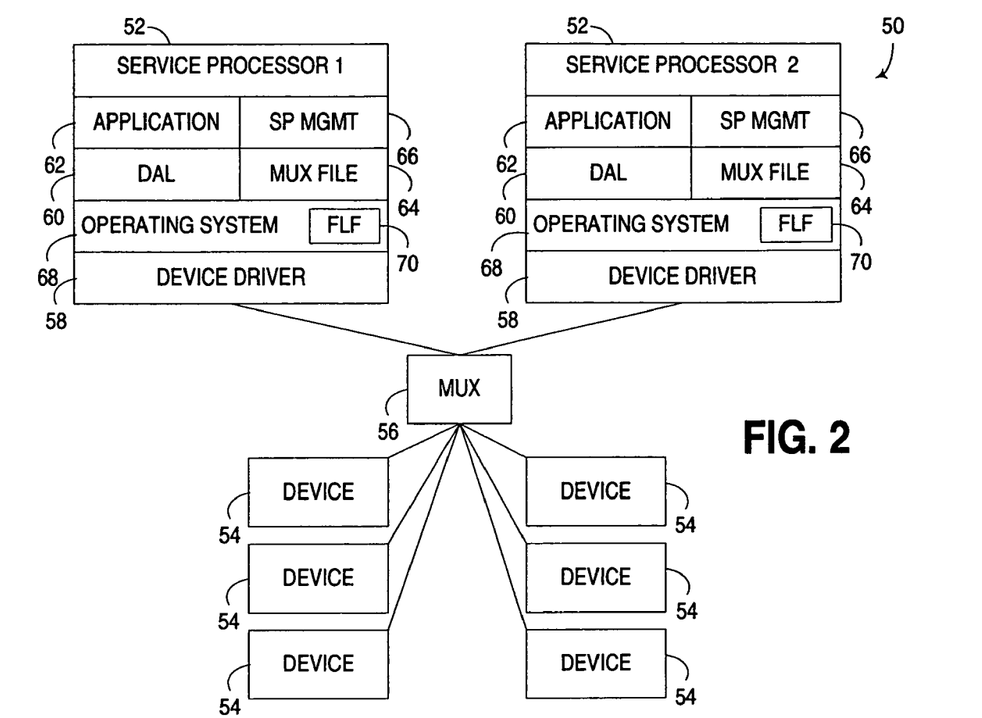
FIG. 2 is a functional block diagram illustrating file-based access control between a plurality of shared hardware devices by a plurality of service processors of the type referenced in FIG. 1.

FIG. 2 illustrates in greater detail the primary software components utilized to implement file-based access control in an apparatus 50 (which may be implemented in a similar manner to apparatus 10 of FIG. 1). Apparatus 50 is shown incorporating a pair of service processors 52 coupled to a plurality of hardware devices 54 through a multiplexer 56. Furthermore, within each apparatus 50 is included one or more device drivers 58, one or more device access layers (DAL's) 60, one or more applications 62, a MUX file 64 and a service processor (SP) management application 66, and an operating system 68. Also illustrated in operating system 68 is a file locking facility (FLF) 70 that provides file-based locking functionality native to the operating system.

A device driver 58 is typically provided for each device 54; however, in the illustrated embodiment, no such device driver is provided for multiplexer 56. In other embodiments, multiplexer 56 may be managed in a similar manner to other devices 54, whereby a device driver may be utilized to manage the multiplexer in other embodiments.

Device access layer 60 is used to access device drivers 58 on behalf of applications 62, 66, and as a result, hide device accesses from applications 62, 66. In the illustrated embodiment, different DAL's may be provided to support different communication protocols, e.g., JTAG communications, GPIO communications, and I2C communications. It is also within DAL's 60 that attempts are made to obtain locks on MUX file 64 on behalf of applications 62, 66 to enable access to hardware devices 54. Typically, a device open to the DAL by an application obtains a shared lock for the application, while a close to the DAL releases the lock.

Applications 62 are typically configured to perform various initialization, system configuration, and runtime diagnostics functions, e.g., to provide on Demand and VPD support, power management, system monitoring, etc. It will be appreciate that other application functions may be utilized in other environments.

MUX file 64 is typically created at system boot time whenever the multiplexer is first detected. The MUX file is associated with a single multiplexer or other communication path component, and is used to gate access to every device 54 that is coupled to a service processor through multiplexer 56. A table is used by the DAL to match the MUX file to each hardware device 54 coupled to the multiplexer, such that the table may be accessed when a device is being accessed to determine the appropriate MUX file with which the device is associated. Multiple MUX files may be provided to support multiple multiplexers, and as noted in FIG. 2, a separate MUX file 64 associated multiplexer 56 is maintained in each service processor 52 coupled to multiplexer 56.

SP management application 66 in the illustrated embodiment is used to obtain an exclusive lock on MUX file 64 when service processor 52 is first initialized, and is used to release the exclusive lock whenever the service processor has control over the multiplexer. Furthermore, as described in greater detail below, SP management application 66 is used to obtain an exclusive lock on MUX file 64 whenever another service processor has control of the multiplexer, or whenever another service processor is attempting to gain control of the multiplexer and is awaiting a release by the service processor upon which SP management application 66 is currently running. In other environments, no dedicated SP management application may be used.

Operating system 68 may be implemented, for example, as an embedded Linux operating system, which incorporates as part of the native file system thereof, a file locking facility (FLF) 70. In that operating system 68 is embedded, the runtime memory, and the nonvolatile storage for maintaining the operating system program code, the program code for components 58-62 and 66, and MUX file 64 as well as any other files managed by the operating system, may all be disposed on the same integrated circuit as service processor 52. In other embodiments, such components may be resident on other IC's that are accessible by service processor 52.

Generally, when an application "opens" a device, an indication of shared or exclusive is given. In some implementations, multiple shared locks and nested locks may be supported to prevent deadlock conditions. In other implementations, applications other than a management application may be restricted from obtaining anything other than a shared lock.

Before a hardware device can be used, a lock on the MUX file must be obtained. When finished using the device the lock is released. In the illustrated embodiment, which relies on embedded Linux, locking may be accomplished via the flock structure and the fcntl system call.

In the illustrated implementation, only a single service processor may use the multiplexer at any time, so the service processor that is not using the multiplexer (specifically the SP management application thereon) obtains an exclusive lock on the MUX file to prevent any applications from trying to use a device accessible via the multiplexer. An exclusive lock is thus obtained by the SP management application when the service processor is not allowed to access a device via the multiplexer, or when access to devices via the multiplexer is to be transferred to the other service processor.

In the first case, another service processor already has control over the multiplexer, so no applications on the service processor can access any devices. In the second case, the service processor has control but wants to transfer control to another service processor. As such, an exclusive lock is obtained to prevent applications that do not already have the lock in a shared state while waiting for those applications that already have the lock in a shared state to complete. Once all shared locks are released, only then can control of the multiplexer be transferred, thereby ensuring that no applications are still accessing any devices when the transfer occurs.

In the illustrated embodiment, ownership over the multiplexer is a component of the role of a primary service processor. As such, the service processors typically implement a protocol to determine which service processor is primary and which is backup. To implement a change of ownership, therefore, typically one service processor is either relinquishing its role as primary, or a backup service processor has detected that the primary service processor has failed in some aspect and that the backup service processor must assume the primary role. In association with the latter instance, the backup service processor may also initiate a reset of the primary service processor when assuming the primary role to avoid a conflict between the service processors. It will be appreciated, however, that various manners of assigning primary or backup status to a service processor, and switching the status for a service processor, may be used in other embodiments. It will also be appreciated that other manners of assigning ownership of a multiplexer to a processor may be used in other embodiments.

As noted above, typically applications are restricted to obtaining a shared lock to use a device. Depending upon their function, applications may choose to wait for a shared lock, or if failure to obtain a shared lock is unexpected, an error may be logged to assist in program debug. In other implementations, applications may be permitted to request exclusive locks if necessary.

Figure 3:
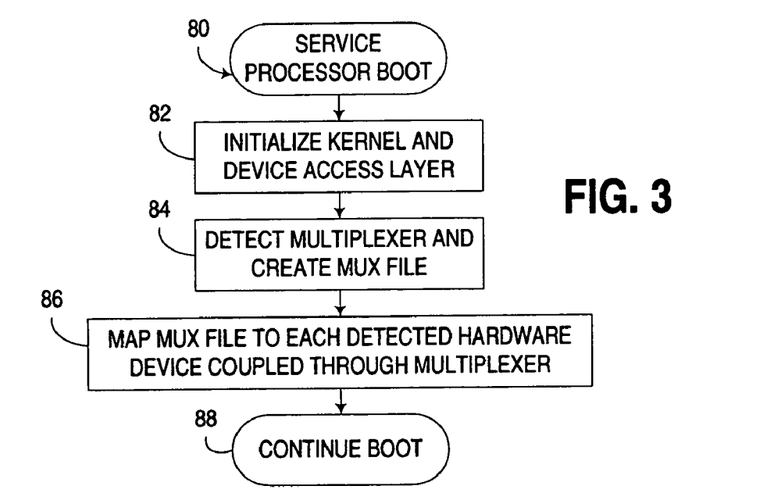
FIG. 3 is a flowchart illustrating a service processor boot routine executed during initialization of the service processors referenced in FIG. 2.

FIG. 3 next illustrates a service processor boot routine 80 that may be executed during initialization of a service processor 52, and is specifically limited to those operations performed during initialization that are relevant to file-based access control consistent with the invention. Routine 80 is executed upon power up of a service processor, and begins with low level initialization of the kernel and device access layer(s) for the service processor, as shown in block 82. Thereafter, in block 84, the multiplexer is detected, and as a result, a MUX file is created therefor. Next, in block 86, as each hardware device coupled to the multiplexer is detected, the MUX file is mapped to such hardware device, e.g., using a table that is accessible to the DAL. In addition, other initialization operations associated with initializing each hardware device may also be performed at this time. Once mapping has been performed in block 86, the remainder of the boot up operation is performed, as shown in block 88.

Figure 4:
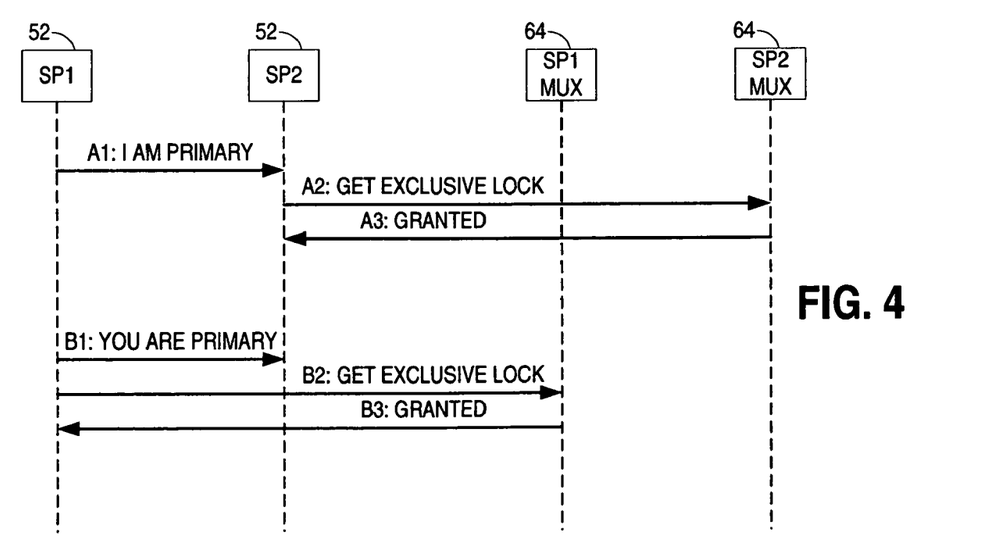
FIG. 4 is a sequence diagram illustrating an ownership acquisition protocol performed by the service processors referenced in FIG. 2.

As noted above, a service processor is configured to obtain an exclusive lock on a MUX file whenever the service processor does not currently have control over an associated multiplexer. In this regard, FIG. 4 illustrates an ownership acquisition protocol performed by service processors 52 (also denoted as "SP1" and "SP2") during initialization to initially obtain an exclusive lock on a MUX file in the service processor that is determined to not have control over the multiplexer as a result of the ownership acquisition protocol. Specifically, in the illustrated embodiment, one service processor is designated a primary processor, with the other designated as a backup processor that is used predominantly for redundancy purposes. In this embodiment, it is the primary processor that is given control over the multiplexer.

Steps A1-A3 illustrate the sequence of operations that occur when SP1 determines that it is the primary service processor. Specifically, based upon a protocol known to both service processors, service processor SP1 determines that it is the primary, and sends a message to service processor SP2 in step A1 indicating that it is the primary. As a result, service processor SP2 requests an exclusive lock for the SP2 MUX file 64 in step A2, which, upon acquisition of the lock, results in a "granted" indication being returned to service processor SP2 in step A3.

Steps B1-B3, on the other hand, illustrate the sequence of operations that occur when SP1 determines that it is not the primary service processor. Specifically, based upon a protocol known to both service processors, service processor SP1 determines that it is not the primary, and sends a message to service processor SP2 in step B1 indicating that SP2, rather than SP1, is the primary. Thereafter, service processor SP1 requests an exclusive lock for the SP1 MUX file 64 in step B2, which, upon acquisition of the lock, results in a "granted" indication being returned to service processor SP1 in step B3.

Figure 5:
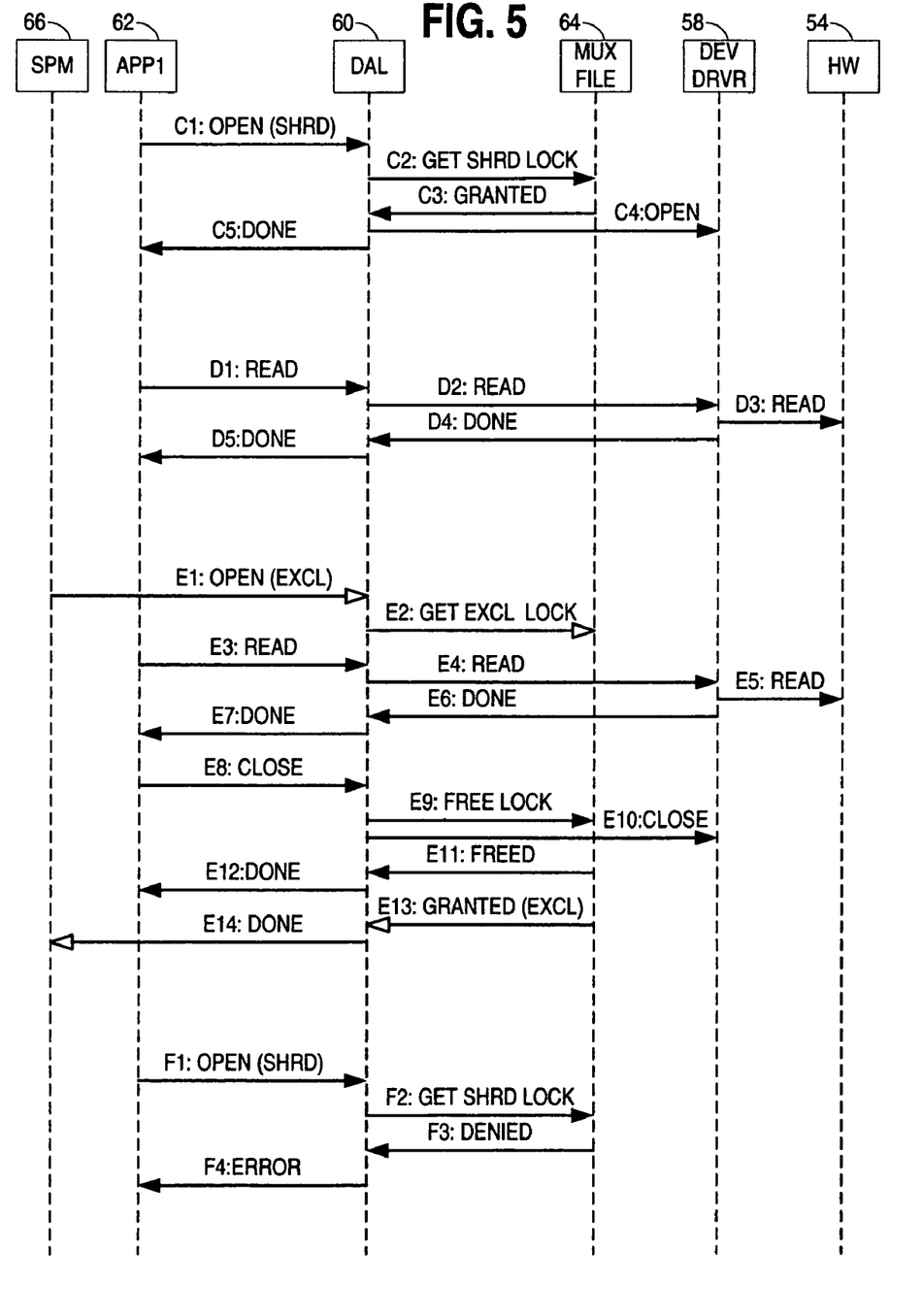
FIGS. 5-7 are sequence diagrams illustrating various protocols for controlling access to a shared hardware device on one of the service processors referenced in FIG. 2.
Figure 6:
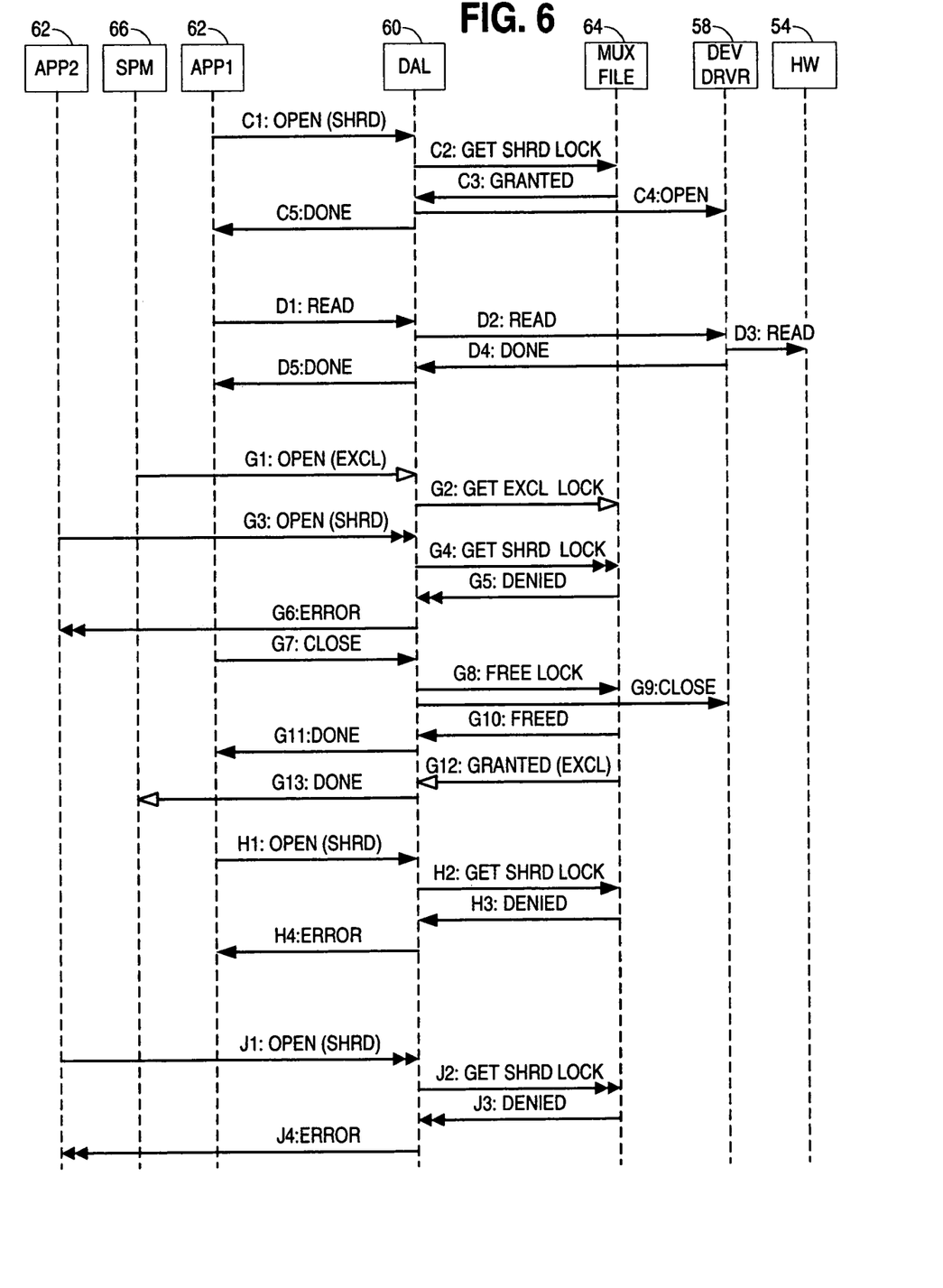
Figure 7:
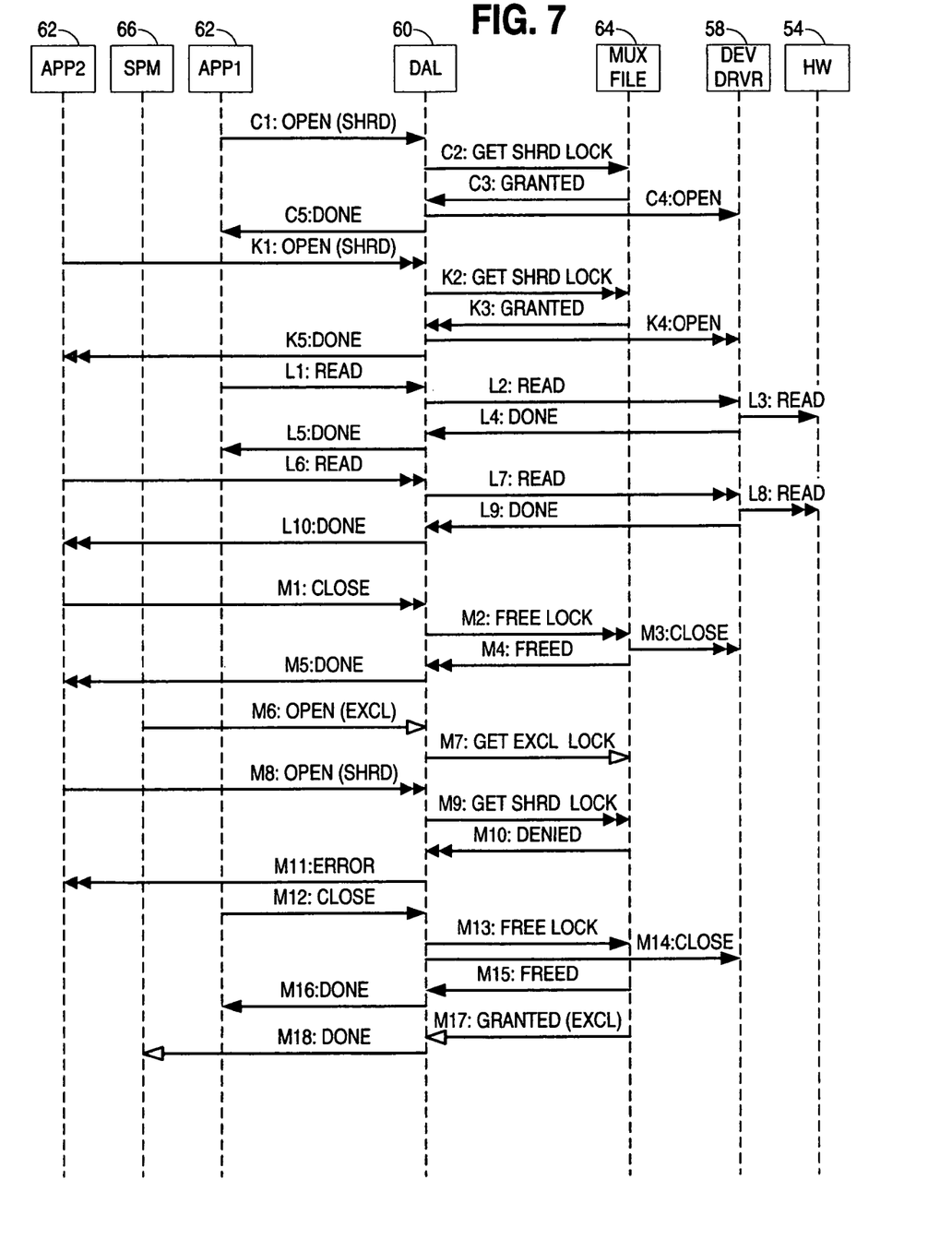

FIGS. 5-7 next illustrate various protocols for controlling access to a shared hardware device on one of service processors 54, and illustrate how certain actions by different applications executing on a service processor are handled based upon the status of a lock on a MUX file 64.

FIG. 5, for example, illustrates an implementation where a first application 62 ("APP1") is running along with an SP management application 66 ("SPM"), where the service processor is initially in control of the multiplexer, and thus is able to access a device 54 ("HW"). As shown in steps C1-C5, APP1 may request access to device 54 via an open call to DAL 60 in step C1, requesting shared access thereto. Then, in step C2, DAL 60 attempts to obtain a shared lock on MUX file 64, e.g., using the flock structure and fcntl system call supported by the file locking facility of embedded Linux. Since the multiplexer is controlled by the service processor, the lock is obtained, with a "granted" indicator returned to DAL 60 in step C3. DAL 60 may then issue an open request to device driver 58 in step C4, and return a "done" indication to APP1 in step C5.

At this point, APP1 has shared access to device 54. Thus, as shown in steps D1-D5, APP1 can access the device, e.g., via a read request to DAL 60 as shown in step D1. The request is handled by DAL 60 by forwarding the read request to device driver 58 in step D2, resulting in a suitable request being forwarded to device 54 in step D3. Device driver 58 returns a "done" indication in step D4, which is forwarded by DAL 60 to APP1 in step D5.

Steps E1-E14 next illustrate an attempt by SPM 66 to obtain an exclusive lock on the MUX file, e.g., in response to a request to transfer control of the multiplexer to the other service processor. At this point, APP1 still has a shared lock on the MUX file, and as a result, an open request from SPM 66 to DAL 60 obtain an exclusive lock on MUX file 64, as shown in step E1, will result in an attempt to obtain an exclusive lock on MUX file 64 as shown in step E2 that does not immediately complete. Instead, the request is blocked until APP1 releases the shared lock on MUX file 64.

As shown in steps E3-E7, therefore, APP1 may continue to access device 54. Then, once APP1 is finished accessing device 54, APP1 may issue a close request to DAL 60, as shown in step E8. This results in DAL 60 freeing the lock on MUX file 64 in step E9, along with issuing a close request to device driver 58 in step E10. DAL 60 then receives a "freed" indication when the lock on MUX file 64 is released (step E11), whereby DAL 60 may then return a "done" indication to APP1 is step E12.

Furthermore, once the shared lock has been released, the request for an exclusive lock by SPM 66 can complete. As such, in step E13, DAL 60 receives an indication that the request has been granted, and that SPM 66 has an exclusive lock on the MUX file. DAL 60 thus forwards a "done" indication to SPM 66 in step E14.

Once the exclusive lock is obtained by SPM 66, no application on the service processor is permitted to access the device. Specifically, as shown in steps F1-F4, APP1 may request access to device 54 via an open call to DAL 60 in step F1, requesting shared access thereto. Then, in step F2, DAL 60 attempts to obtain a shared lock on MUX file 64. Since SPM 66 has an exclusive lock on the MUX file, however, the request fails, and a "denied" indication is returned to DAL 60 in step F3. DAL 60 then returns an "error" indication to APP1 in step F4, indicating that the request to open the device has failed.

FIG. 6 next illustrates the interaction between multiple applications 62 ("APP1" and "APP2") residing on the same service processor. In particular, steps C1-C5 and D1-D5 illustrate the acquisition of a shared lock by APP1 and the access of device 54 by APP1 once the shared lock has been obtained.

Steps G1-G13 illustrate, similar to steps E1-E14, an attempt by SPM 66 to obtain an exclusive lock on MUX file 64 while APP1 has a shared lock thereto. However, unlike steps E1-E14, steps G1-G13 illustrate an attempt by APP2 to obtain a shared lock on the MUX file after a request has been made by SPM 66 to obtain the exclusive lock. Specifically, as shown in steps G1 and G2, SPM 66 makes a request to obtain an exclusive lock, which is held until the shared lock held by APP1 is released. Next, as illustrated in steps G3-G6, APP2 makes a request to open device 54 with shared access, by issuing an open request to DAL 60 (step G3), which results in an attempt to obtain a shared lock in step G4. Since SPM 66 has an exclusive lock pending on the MUX file, however, the request fails, and a "denied" indication is returned to DAL 60 in step G5. DAL 60 then returns an "error" indication to APP2 in step G6, indicating that the request to open the device has failed.

Thereafter, in steps G7-G11, APP1 releases the shared lock on MUX file 64, similar to steps E8-E12. Once the lock is released, the request for an exclusive lock by SPM 66 can complete. As such, in step G12, DAL 60 receives an indication that the request has been granted, and that SPM 66 has an exclusive lock on the MUX file. DAL 60 thus forwards a "done" indication to SPM 66 in step G13.

Next, as illustrated in steps H1-H4 and J1-J4 (which operate in a similar manner to steps F1 and F4), once the exclusive lock is held by SPM 66, no application on the service processor is permitted to access the device. As such, open requests issued by APP1 (steps H1-H4) and APP2 (steps J1-J4) are denied, with "error" indications returned to each application responsive to the requests.

FIG. 7 next illustrates the interaction between applications APP1 and APP2 in obtaining concurrent shared access to device 54. In particular, steps C1-C5 illustrate the acquisition of a shared lock by APP1, while steps K1-K5 illustrate the acquisition of a shared lock by APP2. Furthermore, as shown in steps L1-L10 (which function in a similar manner to steps D1-D5), when both applications have shared access, both applications can issue access requests to device 54.

Steps M1-M18 next illustrate the release of the shared lock by APP2, followed by an attempt to reacquire the shared lock after SPM 66 has requested an exclusive lock after APP2 has released the lock. Specifically, steps M1-M5 illustrate release of the shared lock by APP2 (similar to steps E8-E12), followed by an attempt by SPM 66 to obtain an exclusive lock on MUX file 64 in steps M6-M7.

Of note, since APP1 still has a shared lock to the MUX file, the request is held until the shared lock held by APP1 is released. Nonetheless, no other applications, even applications that previously held a lock to the MUX file, are able to reacquire the lock. Consequently, as shown in steps M8-M11 (which are similar to steps G3-G6), an open request by APP2 fails, and an "error" indication is returned to APP2. Thereafter, once APP1 releases the shared lock on MUX file 64, as shown in steps M12-M16, the request for an exclusive lock by SPM 66 can complete. As such, in step M17, DAL 60 receives an indication that the request has been granted, and that SPM 66 has an exclusive lock on the MUX file. DAL 60 thus forwards a "done" indication to SPM 66 in step M18.

It will be appreciated that implementation of the herein-described functionality within a service processor incorporating an embedded Linux operating system environment would be well within the abilities of one of ordinary skill in the art having the benefit of the instant disclosure. Moreover, various additional modifications may be made to the illustrated embodiments without departing from the spirit and scope of the invention. Therefore, the invention lies in the claims hereinafter appended.

What is claimed is:

1. A method of accessing a hardware device shared by a plurality of processors, the method comprising:
   associating the shared hardware device with a file accessible by a first processor among the plurality of processors; and
   controlling access to the shared hardware device by at least one application executing on the first processor using a lock associated with the file, wherein controlling access to the shared hardware device is performed by using an operating system file locking facility to control the lock associated with the file, wherein the operating system file locking facility is resident in the first processor, wherein controlling access to the shared hardware device is performed by requesting the lock associated with the file from the file locking facility, and wherein a status of the shared hardware device is represented by a status of the lock associated with the file.

2. The method of claim 1, further comprising associating the shared hardware device with a second file accessible by a second processor among the plurality of processors.

3. The method of claim 1, further comprising creating the file during boot up of the first processor in response to detecting a shared communication path through which the shared hardware device is coupled to the plurality of processors, wherein the file is further associated with the shared communication path.

4. The method of claim 3, wherein the shared communication path comprises a multiplexer, wherein the file is associated with the multiplexer.

5. The method of claim 3, further comprising associating a second shared hardware device that is accessible by the plurality of processors through the shared communication path with the file.

6. The method of claim 1, wherein each of the plurality of processors comprises a service processor coupled to the shared hardware device through common multiplexer, wherein the file is associated with the multiplexer.

7. The method of claim 6, wherein the first processor has resident thereon an operating system, a device access layer, and a device driver associated with the shared hardware device, wherein no device driver is associated with the multiplexer on the first processor, and wherein controlling access to the shared hardware device includes attempting to obtain the lock associated with the file using the device access layer in response to a request made by the application to the device access layer to access the shared hardware device.

8. The method of claim 1, wherein controlling access to the shared hardware device comprises:
   determining if the first processor has control over the shared hardware device; and
   if so, obtaining the lock on the file to grant to the application access to the shared hardware device.

9. The method of claim 8, wherein determining if the first processor has control over the shared hardware device includes accessing the lock on the file.

10. The method of claim 8, further comprising denying the application access to the shared hardware device in response to determining that a processor other than the first processor has control over the shared hardware device.

11. The method of claim 10, further comprising holding the lock on the file in an exclusive state for a management application resident on the first processor whenever a processor other than the first processor has control over the shared hardware device to inhibit another application executing on the first processor from obtaining access to the shared hardware device.

12. The method of claim 10, further comprising obtaining the lock on the file in an exclusive state for a management application resident on the first processor while the first processor has control over the shared hardware device to enable a processor other than the first processor to take control over the shared hardware device.

13. The method of claim 12, wherein each application resident on the first processor other than the management application is permitted to obtain the lock on the file only in a shared state, and wherein obtaining the lock on the file in the exclusive state for the management application includes granting the lock only after every other application resident on the first processor that has the lock on the file in the shared state has released the lock.

14. An apparatus, comprising:
a processor configured to access a hardware device shared with at least one other processor; and
program code resident on the processor and configured to associate the shared hardware device with a file accessible by a processor, and control access to the shared hardware device by at least one application executing on the processor using a lock associated with the file, wherein the program code is configured to control access to the shared hardware device by using an operating system file locking facility to control the lock associated with the file, wherein the operating system file locking facility is resident in the first processor, wherein controlling access to the shared hardware device is performed by requesting the lock associated with the file from the file locking facility, and wherein a status of the shared hardware device is represented by a status of the lock associated with the file.

15. The apparatus of claim 14, wherein the program code is further configured to create the file during boot up of the processor in response to detecting a multiplexer through which the shared hardware device is coupled to the processor and the other processor, wherein the file is further associated with the multiplexer.

16. The apparatus of claim 15, wherein the processor comprises a service processor, and wherein the shared hardware device is in a central electronics complex of a computer.

17. The apparatus of claim 16, further comprising an operating system and a device driver associated with the shared hardware device, wherein the program code is resident in a device access layer, wherein no device driver is associated with the multiplexer, and wherein the program code is configured to control access to the shared hardware device by attempting to obtain the lock associated with the file in response to a request made by the application to the device access layer to access the shared hardware device.

18. The apparatus of claim 17, wherein the program code is configured to control access to the shared hardware device by requesting the lock associated with the file from the file locking facility.

19. The apparatus of claim 14, wherein the program code is configured to control access to the shared hardware device by accessing the lock on the file to determine if the processor has control over the shared hardware device, if so, obtaining the lock on the file to grant to the application access to the shared hardware device, and if not, denying the application access to the shared hardware device.

20. The apparatus of claim 19, wherein the program code includes a management application, and wherein the program code is configured to hold the lock on the file in an exclusive state for the management application whenever another processor has control over the shared hardware device to inhibit another application executing on the processor from obtaining access to the shared hardware device.

21. The apparatus of claim 19, wherein the program code includes a management application, and wherein the program code is configured to obtain the lock on the file in an exclusive state for the management application while the processor has control over the shared hardware device to enable another processor to take control over the shared hardware device.

22. The apparatus of claim 21, wherein each application resident on the processor other than the management application is permitted to obtain the lock on the file only in a shared state, and wherein the program code is configured to obtain the lock on the file in the exclusive state by granting the lock only after every other application resident on the processor that has the lock on the file in the shared state has released the lock.

* * * * *